US005967786A

United States Patent [19]

Wang

[11] Patent Number: 5,967,786

[45] **Date of Patent: *Oct. 19, 1999**

[54] PATTERN CUTTING APPARATUS FOR PAPER MARGIN

[76] Inventor: Shun-Yi Wang, Sheng North Road, Taipei, Taiwan

[ * ] Notice: This patent is subject to a terminal disclaimer.

[21] Appl. No.: 09/112,217

[22] Filed: Jul. 9, 1998

[51] Int. Cl.[6] .................... G09B 11/00

[52] U.S. Cl. .................... 434/82; 434/81; 83/686; 83/687; 83/691; 83/620

[58] Field of Search .................... 83/886, 621, 549, 83/618, 686, 687, 691, 620; 434/82

[56] References Cited

U.S. PATENT DOCUMENTS 5,697,278 12/1997 Shun-Yi .................... 83/686

*Primary Examiner*—Robert A. Hafer
*Assistant Examiner*—Bena B. Miller
*Attorney, Agent, or Firm*—Rosenberg, Klein & Bilker

[57] ABSTRACT

A pattern cutting apparatus for paper margin, is characterized by having a plurality of lower mold holes of perforate pattern disposed in alignment and paralleled to the distal end of a cutting space, and guide mold holes sharing the common shape with the lower mold holes disposed on a protruding portion of a guide mold board positioned in spaced parallel relationship above said lower mold holes for inserting an upper mold body sharing the common shape.

1 Claim, 3 Drawing Sheets

PATTERN CUTTING APPARATUS FOR PAPER MARGIN

BACKGROUND OF THE INVENTION

1. Field of the Invention

The present invention refers to a pattern cutting apparatus for paper margin, more particularly for cutting along paper or cardboard margins to complete serial perforate patterns for decoration.

2. Prior Art

At present, conventional similar products provide with a cutting apparatus for cutting out multiple shapes of stickers from colored papers to glue on paintings, comprising likely structure disclosed in U.S. Pat. No. 5,697,278. This prior art is applied to cut out multiple shapes of paper slips from colored papers, and those remained colored papers are left useless in irregular shapes.

OBJECTS OF THE INVENTION

The main object of the present invention is to provide a pattern cutting apparatus for paper margin, for decorating papers or cardboard by cutting continuous perforate pattern along the margin.

DETAILED DESCRIPTION OF THE INVENTION

Advantages, structure, and embodiments of the present invention will be apparent by following description with reference to the drawings.

Figure 1:
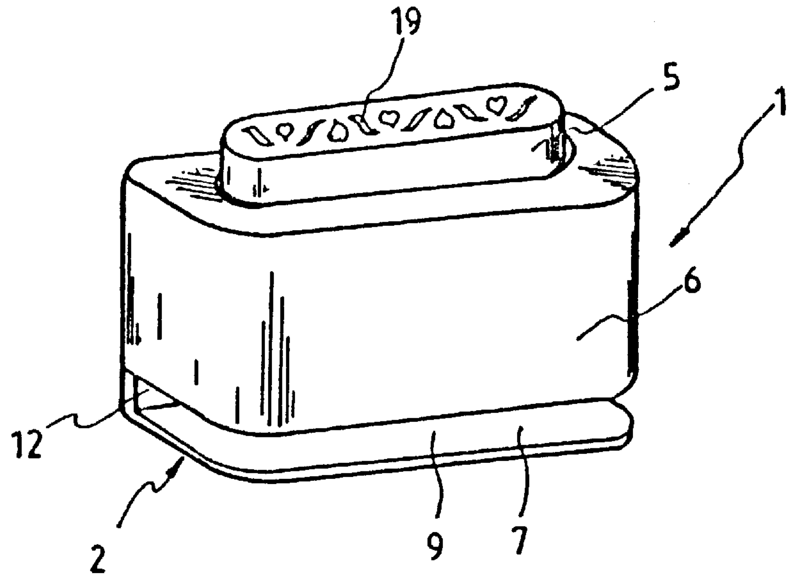
FIG. 1 is a perspective view of this invention.
Figure 2:
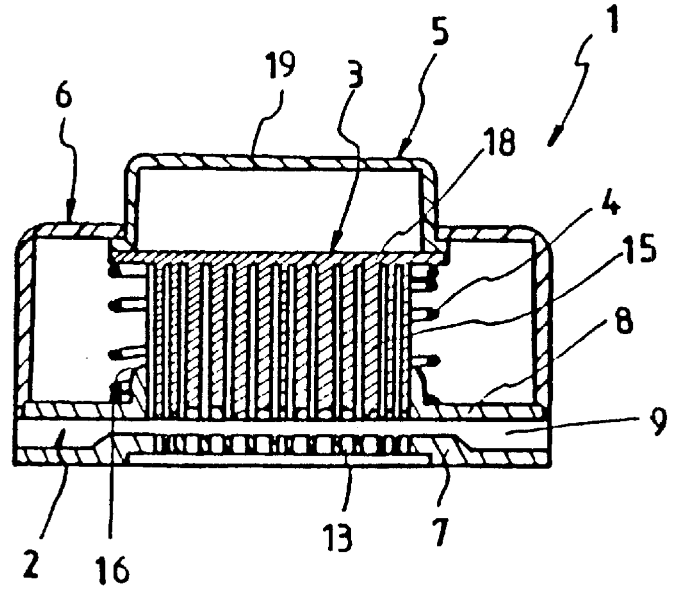
FIG. 2 is a longitudinal cross-sectional view of FIG. 1.
Figure 3:
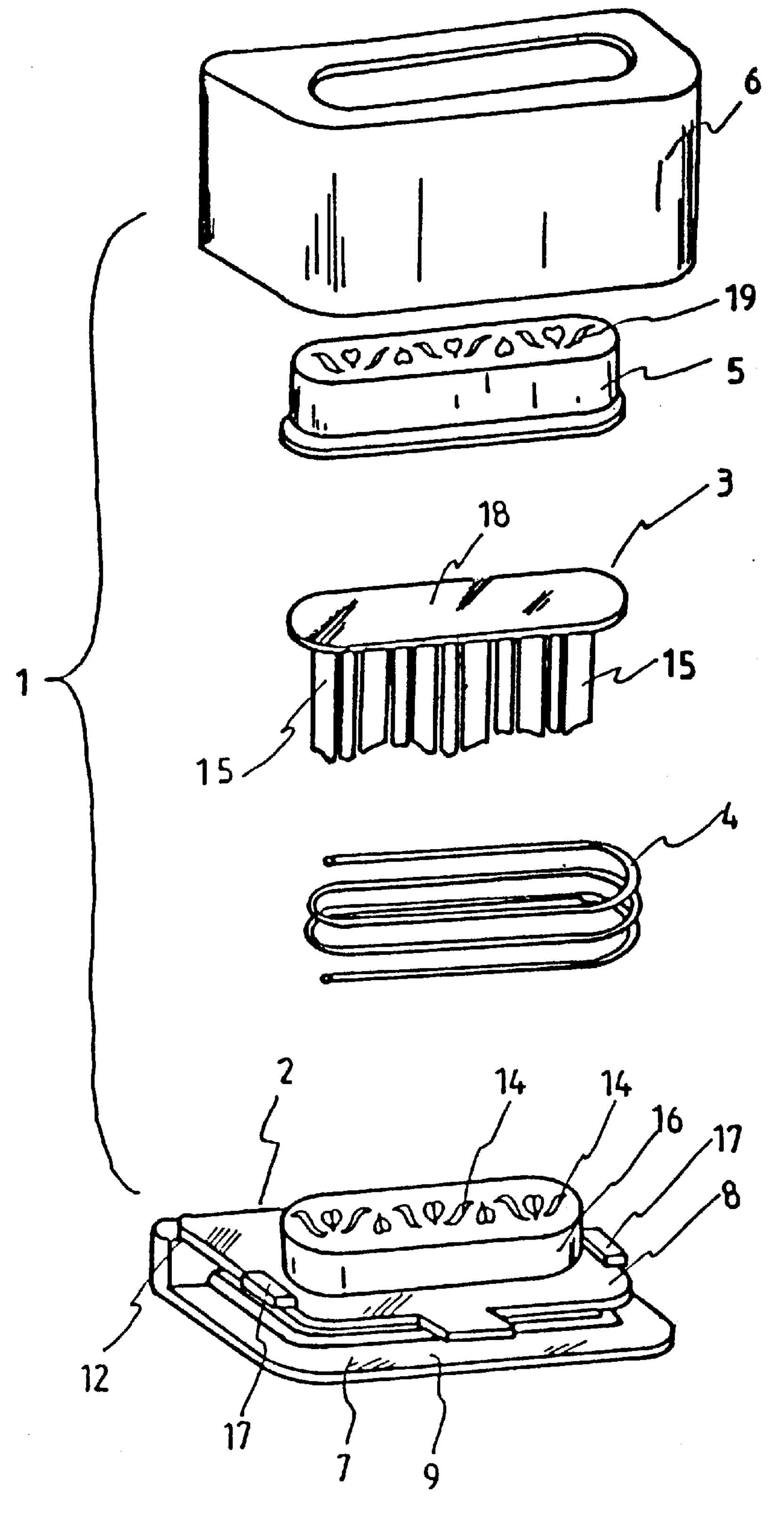
FIG. 3 is a structure discomposed view of FIG. 1.
Figure 4:
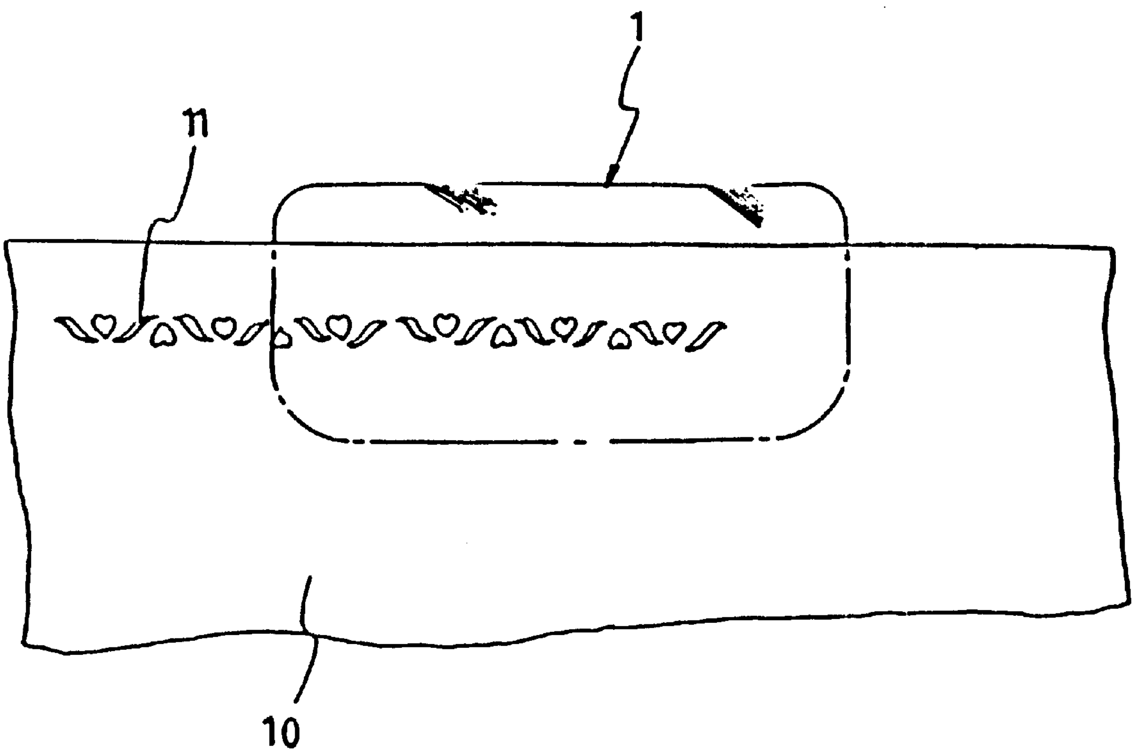
FIG. 4 is a view illustrating the state in use of this invention.

Now referring to FIGS. 1 to 3, there is shown, the present invention of cutting apparatus (1) composed of a base member (2), upper mold (3), compressed spring (4), press-button (5), and shield (6). Wherein, said base member (2) comprises a base board (7) paralleled to and connected upwards with a guide mold board (8) as an integrate body by a rear side wall between the two boards (7)(8) and whereby forming a cutting space (9) for inserting one side of paper or cardboard (10) to cut a serial of perforate patterns (11) along the margin, as shown in FIG. 4. On the base board (7), down below the cutting space (9) a plurality of lower mold holes (13) of perforate design pattern (11) are disposed in alignment and paralleled to a distal end (12) of said base board (7) for matching with the upper mold (3) for cutting simultaneously a corresponding perforate pattern on margin of papers or cardboard (10), as shown in FIG. 4. Guide mold holes (14) of the guide mold board (8), located in spaced parallel above the lower mold holes (13), share in common the shape of the lower mold holes (13) and are used to insert and guide the mold body (15) of the upper mold (3) into the right position in order to match the lower mold holes (13) with the mold body (15). In order to guide the mold body (15), the wall of the guide mold holes (14) extends upward within a cylindrical shaped protruding portion (16). Such protruding portion (16) can hold the bottom portion of the compressed spring (4). Somewhere around the guide mold board (8) there are installed blocks (17) to secure the shield (6).

The mold body (15) of upper mold (3) shares a common shape with the lower mold holes (13) and have a common pressure plate (18) at its upper portion for receiving downward pressure from a press button (5) to contact the lower mold holes (13) to cut paper (10) and simultaneously the mold body (15) is inserted into guide mold holes (14) and positioned by the support of a compressed spring (4) at the lower end of the mold body (15). Said compressed spring (4) is coupled to a protruding portion (16) disposed on the guide mold board (8) for supporting the upper mold (3) maintained between upper end of guide mold board (8) and lower end of pressure plate (18) to make the mold body (15) of upper mold (3) automatically retract from the lower mold holes (13) and positioned inside the guide mold holes (14). The shape of press button (5) matches to the pressure plate (18) of upper mold (3), disposed between upper end of the pressure plate (18) and shield (6) to keep most of press button (5) protrudent over the shield (6), as shown in FIGS. 1 and 2. There is an indicia (19) indicating the design pattern (11) of cutting apparatus (1) on the top of the press button (5). Thus, users can easily choose whatever they prefer by recognition of the indicia (19) among a set of cutting apparatuses (1). Said shield (6) shares the common shape with the base member (2) and covers the guide mold board (8) of base member (2) exposing the cutting space (9) between guide mold board (8) and base board (7), for receipt of one side of paper or cardboard (10) therein to make paper or cardboard (10) to contact the distal end (12) of cutting space (9) and positioned. When the press button (5) is pushed downward, the perforate design pattern (11) as shown in FIG. 4, is cut on paper or cardboard (10) for decoration.

I claim:

1. A pattern cutting apparatus for cutting a predetermined pattern in a margin of paper or cardboard sheets, comprising:

(a) a base including a substantially planar base board having a plurality of base board holes formed therethrough corresponding to said predetermined pattern, said base board being coupled to a guide mold board vertically displaced and extending substantially parallel to said base board and forming a cutting space therebetween, said guide mold board having a vertically protruding portion having a plurality of guide mold holes formed therethrough and corresponding to said predetermined pattern, said guide mold holes and said base board holes being vertically aligned;

(b) an upper mold having a mold body corresponding to said predetermined pattern, said mold body being fixedly secured to an upper pressure plate;

(c) a compression spring extending around said protruding portion and compressed between said upper pressure plate and said guide mold board;

(d) a press button for contacting an upper surface of said upper pressure plate; and, (e) a shield housing having said press button extending through an upper surface thereof, said shield housing encompassing said upper mold, said compression spring and said protruding portion of said guide mold board.

* * * * *